United States Patent [19]
Daffara et al.

[11] Patent Number: 5,687,165
[45] Date of Patent: Nov. 11, 1997

[54] TRANSMISSION SYSTEM AND RECEIVER FOR ORTHOGONAL FREQUENCY-DIVISION MULTIPLEXING SIGNALS, HAVING A FREQUENCY-SYNCHRONIZATION CIRCUIT

[75] Inventors: Flavio Daffara, Paris, France; Ottavio Adami, La Spezia, Italy

[73] Assignee: U.S. Philips Corporation, New York, N.Y.

[21] Appl. No.: 548,245

[22] Filed: Oct. 25, 1995

[30] Foreign Application Priority Data

Oct. 26, 1994 [FR] France .................................. 94 12823

[51] Int. Cl.[6] ........................................ H04J 11/00
[52] U.S. Cl. ........................ 370/208; 370/210; 370/514; 375/354
[58] Field of Search ........................... 370/100.1, 18, 370/19, 20, 21, 208, 210, 503, 514, 515, 516, 520, 512, 513; 375/200, 205, 373, 375, 354, 355, 365, 366, 667, 369

[56] References Cited

U.S. PATENT DOCUMENTS

| 4,773,085 | 9/1988 | Cordell | 375/375 |
| 5,160,900 | 11/1992 | Visuri | 375/375 |

FOREIGN PATENT DOCUMENTS

0580216A1  1/1994  European Pat. Off. .

Primary Examiner—Benedict V. Safourek
Assistant Examiner—Ajit Patel
Attorney, Agent, or Firm—Steven R. Biren

[57] ABSTRACT

Receiver and transmission system for orthogonal frequency-division multiplexing signals comprising a frequency synchronization circuit (116) which has a local oscillator (214) whose frequency is controlled by a correction signal ε. The latter is generated by a frequency detector (213) which operates in the time domain, by utilizing the redundant information contained in such signals. The performance of the invention is particularly of interest for transmissions on multipath channels which occur in mobile radio, digital television, and so on.

8 Claims, 2 Drawing Sheets

TRANSMISSION SYSTEM AND RECEIVER FOR ORTHOGONAL FREQUENCY-DIVISION MULTIPLEXING SIGNALS, HAVING A FREQUENCY-SYNCHRONIZATION CIRCUIT

FIELD OF THE INVENTION

The invention relates to a data transmission system comprising a transmitter which includes means for converting first frequency-domain signals into second time-domain signals, the second transmitting signals being formed by primary data and secondary data which duplicate the primary data, the transmitter being connected to a receiver which comprises means for reconverting from the time domain to the frequency domain the second signals coming from the transmitter, which receiver furthermore comprises a synchronization circuit with an oscillator that generates a local carrier, while the synchronization circuit determines a correction signal for synchronizing the local carrier. The invention likewise relates to a receiver utilized in such a system.

Such a system and such a receiver have applications for receiving signals transmitted, for example, in an orthogonal frequency-division multiplexing mode, more specifically, by radio channel, cable, satellite, for example, for digital television.

BACKGROUND OF THE INVENTION

The signals transmitted in the orthogonal frequency-division multiplexing mode will be identified in the following as OFDM (Orthogonal Frequency-Division Multiplexing). The OFDM technique consists of subdividing an information signal to be transmitted by distributing it over a large number of elementary low-rate channels. Thus, one considerably selective broadband channel is transformed into a large number of elementary non-selective elementary channels. As the ensemble consists of a broadband channel, it is not very likely that fading during transmission will simultaneously affect the whole channel. This technique makes it also possible to reduce the intersymbol interference.

Thus, to each elementary channel corresponds a frequency, and all the frequencies are symmetrically distributed around a central carrier frequency. As it is hard to accept the use of selective filters at the receiving end, one prefers tolerating an overlap of spectra, but while imposing conditions of orthogonality between the frequencies to eliminate the intersymbol interference at the sampling instants. The whole spectrum of an OFDM signal thus tends towards being a rectangular spectrum.

To avoid problems of spectrum overlap on reception, due to the sampling of the received signal, the side carriers situated left and rightmost in the frequency spectrum are not transmitted. Moreover, the filtering on reception can be realized with less steep edges.

Upon reception, the received signals are to be demodulated and then decoded to restore the original information. This demodulation is carried out by a local oscillator whose frequency is to be slaved to the transmit frequency via a synchronization correction signal. The synchronization of the carrier is a fundamental function of OFDM transmission systems. In fact, a frequency error at the receiving end leads to a loss of orthogonality between the various subcarriers which form the OFDM signal and causes a degradation of total performance of the system.

Document EP 580 216 is known which describes a system and a receiver for orthogonal frequency-division multiplexed signals. This document teaches how to effect the synchronization of the local carrier generated in the receiver by tapping from the output of the demodulator data relating to each of the subcarriers, that is to say, in the frequency domain. Therefore, the energies of the signals corresponding to each subcarrier are calculated. For the signals concerned, there is a symmetrical distribution of the subcarriers with respect to a central carrier and, moreover, certain subcarriers normally need not carry a signal, thus energy. This document uses this symmetrical distribution and this absence of energy in certain farthest subcarriers to deduce therefrom a correction signal which is used to correct the local oscillator. This solution does not need much hardware, but has the drawback of yielding insufficient results in the case of multipath propagation, which is often the case for mobile radio applications.

SUMMARY OF THE INVENTION

It is the main object of the invention to widen the potential of carrier synchronization with disturbed channels such as those which have multiple paths. This must be obtained without complicating the hardware for specific consumer applications, for example, digital television at low cost.

This object is achieved with a receiver and a transmission system of the type described in the opening paragraph, for which the synchronization circuit combines in pairs, in the time domain, at least one primary data with the secondary, corresponding data to produce the correction signal.

Preferably, the invention relates to signals having the OFDM format, for which the data redundancy is ensured by the insertion of a guard interval which duplicates certain data. The role of guard interval is to make the elimination of intersymbol interference possible.

The following advantages will be obtained from the invention:

the processing and necessary hardware means are simple and of little complexity, synchronization is obtained very rapidly, frequency estimation is very good. In the case of multipath channels, the frequency estimation is perfectly non-biased, insensitivity to sampling clock phase errors, robustness to sampling clock frequency errors.

The combination may consist of producing a correction signal formed by an imaginary component of a signal that results either from a multiplication of the primary data by the conjugate of the corresponding secondary data, or from a product of the conjugate of the primary data by the corresponding secondary data. The imaginary component can be calculated from a sole data pair or form a mean value calculated from various data pairs.

These and other aspects of the invention will be apparent from and elucidated with reference to the embodiments described hereinafter.

DESCRIPTION OF PREFERRED EMBODIMENTS

Figure 1:
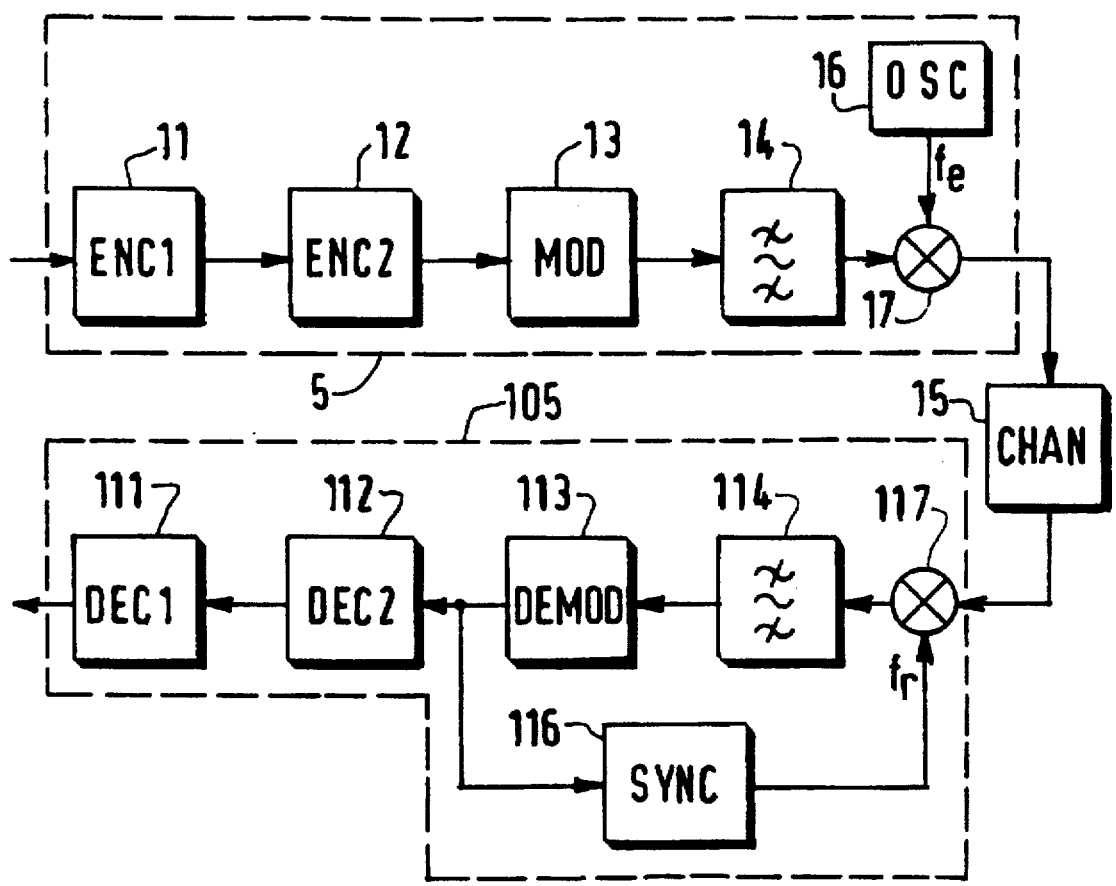
FIG. 1 shows a block diagram of a transceiver system for digital signals.

FIG. 1 shows a block diagram of a digital transmission system formed by a transmitter 5 and a receiver 105 which communicate by a channel CHAN15. This may relate to radio links, satellite links or links via cables. The transmitter 5 comprises in a series combination:

a source encoder ENC1 11 (which may be omitted)
a channel encoder ENC2 12,
an OFDM modulator MOD 13,
a transmitting filter 14,
an oscillator OSC 16 which generates a carrier $f_c$, and
a mixer 17 which mixes the output signal of the transmitting filter with the carrier $f_c$.

For an application to digital television signal transmission with a better quality than that obtained with the PAL standard, the source encoder 11 produces a bit rate of the order of 8 Mbit/s. These samples are encoded by the channel encoder 12 to render them invulnerable to channel imperfections. The modulator 13 then modulates the digital samples on the transmission channel, for example, a ground-based transmission channel (example: broadcasting in an 8 MHz band).

At the receiving end the receiver 105 performs reverse operations to those performed at the transmitting end. Therefore, it comprises (on the output of the channel 15):

a mixer 117 which multiplies the received signal by a regenerated local carrier $f_r$
a receiving filter 114
an OFDM demodulator DEMOD 113
a channel decoder DEC2 112
a source decoder DEC1 111 (which may be omitted)
a carrier synchronization circuit SYNC 116 which generates the regenerated carrier $f_r$.

In order for the description to be clear, the known mechanisms utilized at the transmitting end will be discussed first.

Figure 2:
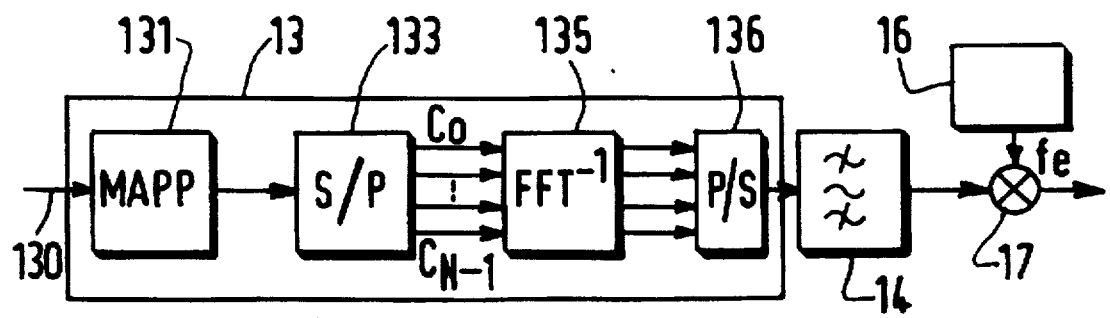
FIG. 2 shows a diagram of an OFDM signal modulator.

At the transmitting end the transmitted carriers are modulated by digital signals to be transmitted according to the known principles. FIG. 2 shows the diagram of a modulator 13 which applies data to the filter 14 and then to the mixer 17 connected to the oscillator 16. The digitized input data present on the input 130 are fed to a binary mapping element MAPP 131 which spreads the input data as coded symbols of a constellation. The coded symbols which appear in series on the output of the element 131 undergo a series/parallel conversion S/P 133, so that N complex symbols $C_k$ arise ($0 \leq k \leq N-1$). A complex symbol $C_k$ is used for modulating a frequency carrier $f_k$ with $f_k = k/T$ (because of orthogonality), where T is the duration of an OFDM symbol and k is the index of the carrier. The combination of all the carriers $f_k$, modulated for generating the aggregate OFDM signal, narrows down to performing the inverse Fourier transform in a circuit 135. In the particular case where N has a power of 2, the inverse Fourier transform can be performed by utilizing the inverse fast Fourier transform (FFT$^{-1}$) as indicated in FIG. 2. This makes it possible to reduce the complexity of the circuit. The N signals coming from circuit 135 undergo a parallel/serial conversion 136. After filtering in 14, the signal coming from filter 14 is mixed with the carrier frequency $f_c$ of the oscillator 16. These modulation techniques are well known to a person of ordinary skill in the art.

Figure 3:
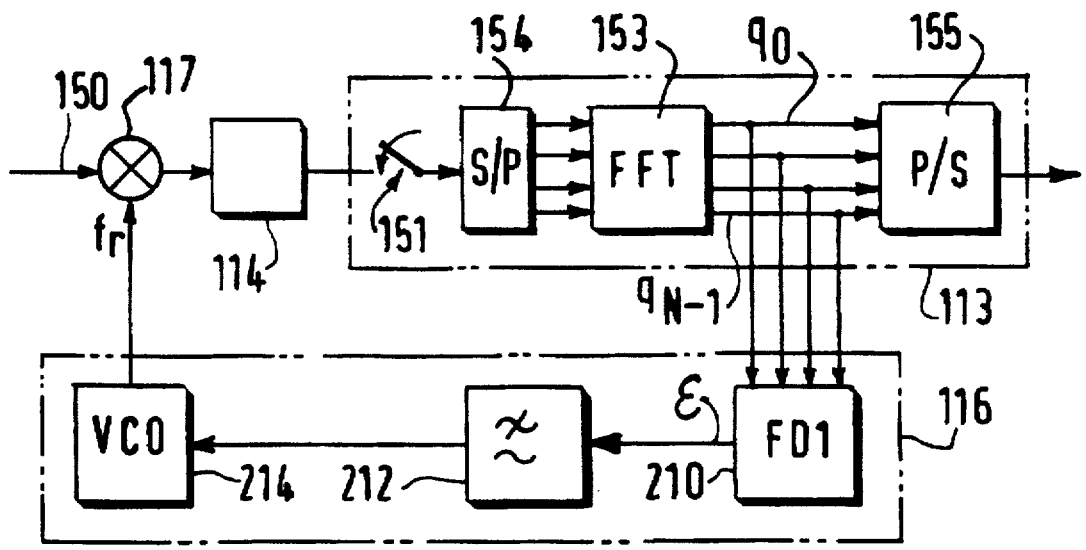
FIG. 3 shows a diagram of a part of a receiver which has a known synchronization circuit.

FIG. 3 shows a demodulator 113 which carries out, at the receiving end, the reverse operations to those carried out at the transmitting end. Therefore, it comprises a sampler 151 which operates at a rate N/T where N is the total number of carriers of the OFDM channel and 1/T is the symbol rate. The samples thus obtained undergo a serial/parallel conversion 154 and are subsequently fed to a device 153 which performs a discrete Fourier transform (preferably Fast Fourier Transform FFT) to deliver in parallel $q_k$ samples ($0 \leq k \leq N-1$) which undergo a parallel/serial transformation in a device 155. The samples received on input 150 arrive at a mixer 117 and are mixed with a regenerated carrier $f_r$ coming from the frequency synchronization device 116 as this is indicated in FIG. 1.

FIG. 3 furthermore represents a diagram of a known synchronization device 116. To the demodulator 113 is connected a frequency detector 210 which produces a correction signal $\epsilon$. The latter, after being filtered by a filter 212, corrects a local oscillator 214 which is a voltage-controlled oscillator, and produces the regenerated local carrier $f_r$ which is fed to the mixer 117. Thus, any frequency offset between the local oscillator 214 and the frequency of the oscillator 16 of the transmitter gives rise to a correction signal $\epsilon$ which is considerable or not, depending on the value of this offset. Depending on the utilized modulations, it may be necessary to add a phase synchronization to the frequency synchronization.

The synchronization circuit shown in FIG. 3 which taps the data from the output of the Fourier transform, thus in the frequency domain, is that of cited document EP 580 216.

Like this document, the invention relates, in essence, to the carrier synchronization at the receiving end, in that the receiver operates with a carrier frequency equal to that used by the transmitter.

Figure 4:
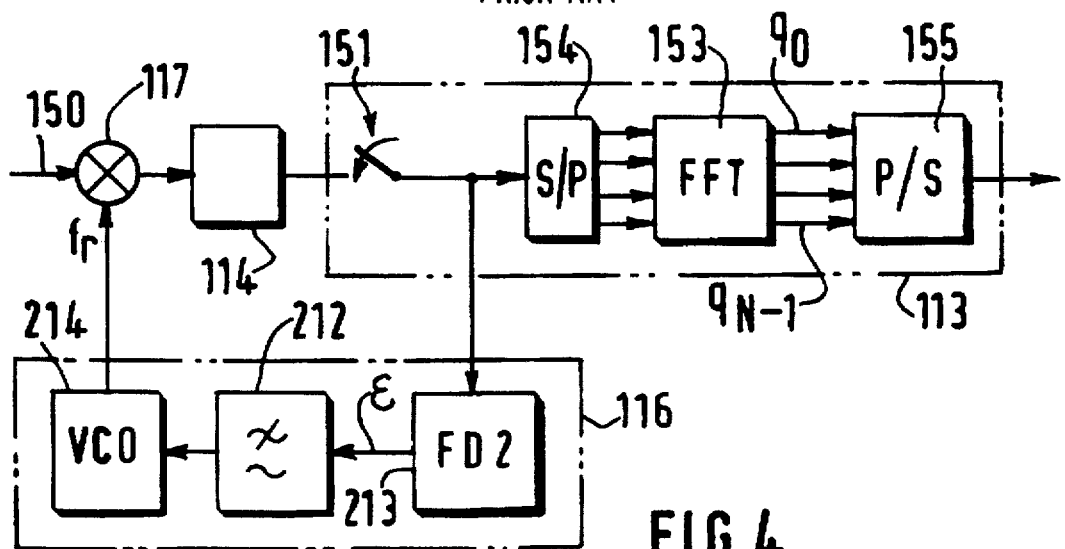
FIG. 4 shows a diagram of a part of a receiver which has a synchronization circuit according to the invention.

According to the invention (FIG. 4), the frequency synchronizing circuit 116 provides the synchronization of samples tapped before the demodulation, that is to say, in the time domain. The samples arrive in series at a frequency detector FD2 213 which produces the correction signal $\epsilon$ which, after being filtered by the filter 212, corrects the local oscillator 214.

The frequency detector FD2 derives benefit from the format of the data as the format appears in a known OFDM signal. An OFDM frame is generally formed by a sequence of special blocks (for example 5 blocks) for synchronizing the frame or for testing the channel, and a sequence of data blocks (for example 100 blocks) containing the data proper. One data block contains information redundancy due to the guard interval to eliminate the phenomena of multipath propagation. At the transmitting end, the redundancy consists of recopying at the beginning of the block a part of the data of the end of the block. Thus, in one block, the same data occur twice.

Figure 5:
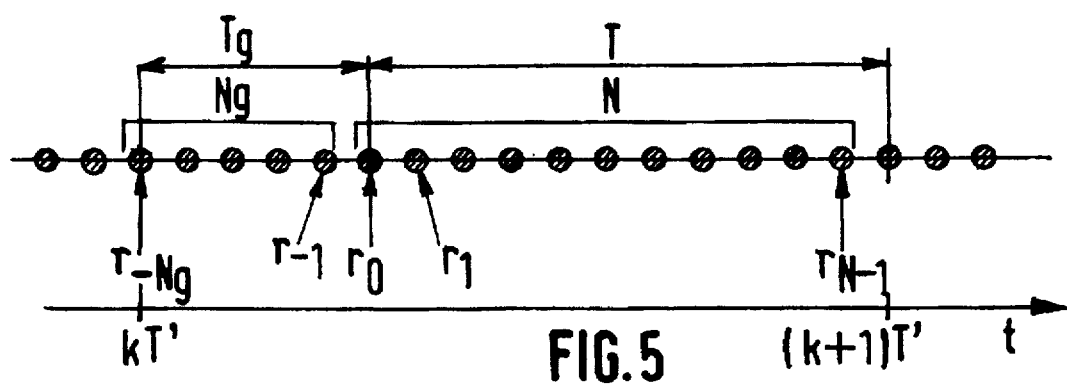
FIG. 5 shows a sample sequence which forms part of a frame of the OFDM signal.

This is shown in FIG. 5, in which the useful part of the data block is plotted against a duration T, while the useful part is preceded, during a guard interval lasting $T_g$, by data copied from the useful part.

Thus, in FIG. 5 the sample $r_{N-1}$ of the useful part is copied as a sample $r_{-1}$ in the guard interval and so on in a step-by-step fashion.

At the receiving end, one is thus to find back a sample $r_{-1}$ which is identical with sample $r_{N-1}$. The correction signal $\epsilon$ is determined by measuring the difference between the two received samples. The frequency detector calculates the correction signal, so that:

$$\epsilon_k = \frac{1}{L} \sum_{i=1}^{L} Im\{r_{N-i} r^*_{-i}\}$$

where:

Im means: "the imaginary part of"
$r^*_i$ is the conjugate sample of the sample $r_{-i}$
the operation performed is the product of the two samples.

The correction signal can be determined of a sole pair $\{r_{N-i}r^*_{-i}\}$, that is to say, L=1, or form a mean value calculated of various pairs $\{r_{N-i}r^*_{-i}\}$.

This may relate to one or various pairs $\{r^*_{N-i}r_{-i}\}$.

The frequency detector FD2 thus comprises multiplier means, for example a multiplier, which multiply said samples in pairs, that is to say, one of the samples and the conjugate of the other sample. It calculates, as required, the mean value of various pairs. The output produces the imaginary part of the obtained result.

The carrier synchronization can thus be realized with each data block contained in a frame, for example, 100 times in said example, and not once per frame when the synchronization is effected via the special synchronization block which each frame contains.

The advantages of this frequency detector are:

its great simplicity: even in the case of a sole pair, the performance obtained is better than that obtained with previous solutions, its great speed at which synchronization is obtained: the acquisition time decreases as a function of L, its very good frequency estimation properties: in the case of multipath channels, the frequency estimation is completely non-biased.

The invention has been described by taking as an example signals of an OFDM format. It can, however, also be applied to signals containing redundant data.

We claim:

1. Data transmission system comprising a transmitter (5) which includes means (135) for converting first frequency-domain signals into second time-domain signals, the second signals being formed by primary data and corresponding secondary data which duplicate the primary data, the transmitter being coupled to a receiver (105) which comprises means (153) for reconverting from the time domain to the frequency domain the second signals coming from the transmitter, which receiver furthermore comprises a synchronization circuit (116) with an oscillator (214) that generates a local carrier ($f_r$), the synchronization circuit (116) determining a correction signal ($\epsilon$) for synchronizing the local carrier ($f_r$), characterized in that the synchronization circuit (116) combines in pairs, in the time domain, at least one primary data with the secondary corresponding data to produce the correction signal.

2. System as claimed in claim 1, characterized in that the correction signal is formed by an imaginary component of a signal that results either from a multiplication of the primary data by the conjugate of the secondary data, or from a product of the conjugate of the primary data by the corresponding secondary data, or by a mean value calculated from various imaginary components which relate to various pairs of said data.

3. System as claimed in claim 1, characterized in that the transmitter (5) produces a signal in the format called orthogonal frequency-division multiplexing format and in that the receiver (105) processes said signals coming from the transmitter.

4. Receiver for receiving a transmitting signal which contains primary data and secondary data which duplicate the primary data, the receiver comprising means for converting the transmitting signal from the time domain to the frequency domain, the receiver furthermore comprising a synchronization circuit with an oscillator (214) that generates a local carrier ($f_r$), while the synchronization circuit (116) determines a correction signal ($\epsilon$) for synchronizing the local carrier ($f_r$), characterized in that the synchronization circuit (116) combines in pairs, in the time domain, at least one primary data with the secondary, corresponding data to produce the correction signal.

5. Receiver as claimed in claim 4, characterized in that the correction signal is formed by an imaginary component of a signal that results either from a multiplication of the primary data by the conjugate of the secondary data, or from a product of the conjugate of the primary data by the corresponding secondary data, or by a mean value calculated from various imaginary components which relate to various pairs of said data.

6. Receiver as claimed in claim 4, characterized in that the received transmitted signal has the format called orthogonal frequency-division multiplexing format.

7. System as claimed in claim 2, characterized in that the transmitter (5) produces a signal in the format called orthogonal frequency-division multiplexing format and in that the receiver (105) processes said signals coming from the transmitter.

8. Receiver as claimed in claim 5, characterized in that the received transmitted signal has the format called orthogonal frequency-division multiplexing format.

* * * * *